(12) United States Patent
Edwards

(10) Patent No.: US 8,740,102 B2
(45) Date of Patent: Jun. 3, 2014

(54) GAS TURBINE ENGINE VALVE

(75) Inventor: Daniel G. Edwards, Brownsburg, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 1416 days.

(21) Appl. No.: 12/625,429

(22) Filed: Nov. 24, 2009

(65) Prior Publication Data

US 2010/0199679 A1  Aug. 12, 2010

Related U.S. Application Data

(60) Provisional application No. 61/203,915, filed on Dec. 30, 2008.

(51) Int. Cl.
*G05D 11/16* (2006.01)
*G05D 23/12* (2006.01)
*G05D 23/13* (2006.01)
*G05D 16/10* (2006.01)

(52) U.S. Cl.
USPC .......... 236/93 A; 236/85; 236/99 K; 236/100; 137/111; 137/112; 137/114; 137/98

(58) Field of Classification Search
USPC .......... 236/85, 93 A, 99 K, 100; 137/98, 111, 137/112, 114
See application file for complete search history.

(56) References Cited

U.S. PATENT DOCUMENTS

| 1,465,172 | A | * | 8/1923 | Parsons et al. ............... 184/6.22 |
| 3,664,129 | A | | 5/1972 | Schwab |
| 3,913,831 | A | * | 10/1975 | Talak ........................... 236/34.5 |
| 4,170,873 | A | | 10/1979 | Milo |
| 4,424,665 | A | | 1/1984 | Guest et al. |
| 4,488,680 | A | | 12/1984 | Itoh |
| 4,569,196 | A | | 2/1986 | Waddington et al. |
| 4,741,152 | A | * | 5/1988 | Burr et al. ....................... 60/772 |
| 4,891,934 | A | | 1/1990 | Huelster |
| 5,121,598 | A | | 6/1992 | Butler |
| 5,241,814 | A | | 9/1993 | Butler |
| 5,339,776 | A | | 8/1994 | Regueiro |
| 5,438,823 | A | | 8/1995 | Loxley et al. |
| 5,615,547 | A | | 4/1997 | Beutin et al. |
| 5,890,509 | A | * | 4/1999 | Becker et al. ............ 137/115.26 |
| 6,830,527 | B2 | | 12/2004 | Wakayama |
| 2002/0128107 | A1 | | 9/2002 | Wakayama |

(Continued)

FOREIGN PATENT DOCUMENTS

JP       58144617 A  *  8/1983

*Primary Examiner* — Allen Flanigan
*Assistant Examiner* — Johan Yavari
(74) *Attorney, Agent, or Firm* — Krieg De Vault LLP

(57) ABSTRACT

A gas turbine engine valve is disclosed. In one form the valve includes two inlets in fluid communication with an outlet. The valve can include a spool having two lands capable of selectively closing either of the two inlets. The valve can include energy storage devices that initially position the spool within a valve housing. A temperature motor is provided to position the spool based upon a temperature of a mixture of working fluid from the two inlets. A working fluid flowing into the first inlet can be in fluid communication with a second end of the valve; and a working fluid flowing into the second inlet can be in fluid communication with a first end of the valve. A relatively high pressure condition at one or the other of the inlets can be used to alter a position of the valve.

17 Claims, 6 Drawing Sheets

(56) References Cited

U.S. PATENT DOCUMENTS

| | | |
|---|---|---|
| 2003/0155006 A1 | 8/2003 | Dyer et al. |
| 2004/0000594 A1 | 1/2004 | Beck et al. |
| 2004/0204281 A1 | 10/2004 | Wakayama |
| 2004/0214686 A1 | 10/2004 | Katou |
| 2004/0216701 A1 | 11/2004 | Hutchins |
| 2005/0081507 A1 | 4/2005 | Tumelty et al. |

\* cited by examiner

GAS TURBINE ENGINE VALVE

CROSS REFERENCE TO RELATED APPLICATIONS

The present application claims the benefit of U.S. Provisional Patent Application 61/203,915, filed Dec. 30, 2008, and is incorporated herein by reference.

GOVERNMENT RIGHTS

The present application was made with the United States government support under Contract No. N00019-02-C-3003, awarded by The Naval Air Systems Command. The United States government has certain rights in the present application.

TECHNICAL FIELD

The technical field relates to gas turbine engine valves.

BACKGROUND

Regulating a working fluid temperature over a wide range of temperatures, pressures, and heat loads remains an area of interest. Some existing systems have various shortcomings relative to certain applications. Accordingly, there remains a need for further contributions in this area of technology.

SUMMARY

One embodiment of the present invention is a unique gas turbine engine spool valve. Other embodiments include apparatuses, systems, devices, hardware, methods, and combinations for regulating outlet temperature of a working fluid cooler with pressure relief. Further embodiments, forms, features, aspects, benefits, and advantages of the present application shall become apparent from the description and figures provided herewith.

DETAILED DESCRIPTION OF ILLUSTRATED EMBODIMENTS

Figure 1:
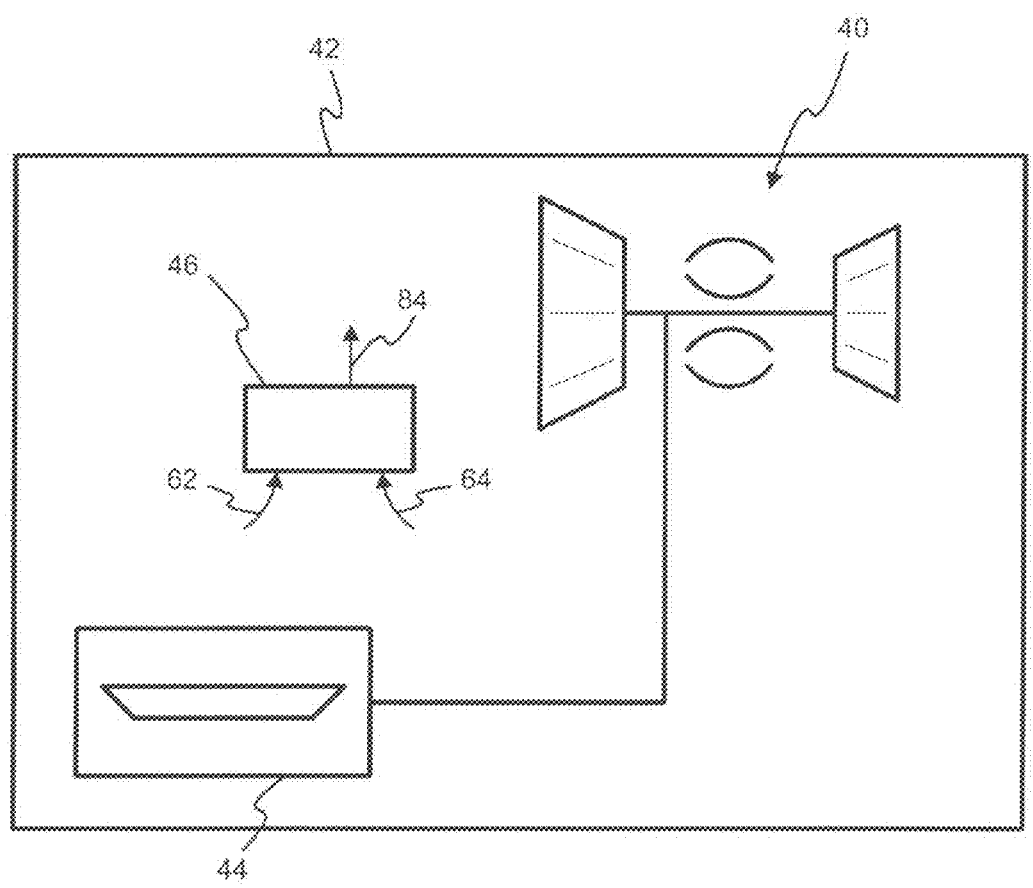
FIG. 1 is a schematic of a gas turbine engine and a valve.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Turning now to FIG. 1, a gas turbine engine 40 is shown coupled with an aircraft 42 and is used to provide flight propulsive power. In the illustrative form, a lift fan 44 is coupled to the gas turbine engine 40 and is used to provide vertical lift for the aircraft 42. The gas turbine engine 40 includes a valve 46 which is used to regulate a flow of working fluid. In one form the working fluid is oil. The valve can be used to mix a core flow of working fluid 64 with a bypass flow of working fluid 62 and create an outlet flow of working fluid 84. The core flow of working fluid 64 is a portion of an initial flow stream of working fluid that is routed through a heat exchanger (not shown). The bypass flow of working fluid 62 is another portion of the initial flow stream of working fluid that does not flow through the heat exchanger. In some forms, the bypass flow of working fluid 62 can include the entire initial flow stream, as is the case when the core flow of working fluid 64 is interrupted and does not flow. Likewise, the core flow of working fluid 64 can include the entire initial flow stream when the bypass flow of working fluid 62 is interrupted. The valve 46 can be used to provide the outlet flow of working fluid 84 to the gas turbine engine 40 and/or the lift fan 44.

As used herein, the term "aircraft" includes, but is not limited to, helicopters, airplanes, unmanned space vehicles, fixed wing vehicles, variable wing vehicles, rotary wing vehicles, hover crafts, and others. Further, the present inventions are contemplated for utilization in other applications that may not be coupled with an aircraft such as, for example, industrial applications, power generation, pumping sets, naval propulsion and other applications known to one of ordinary skill in the art.

Figure 2:
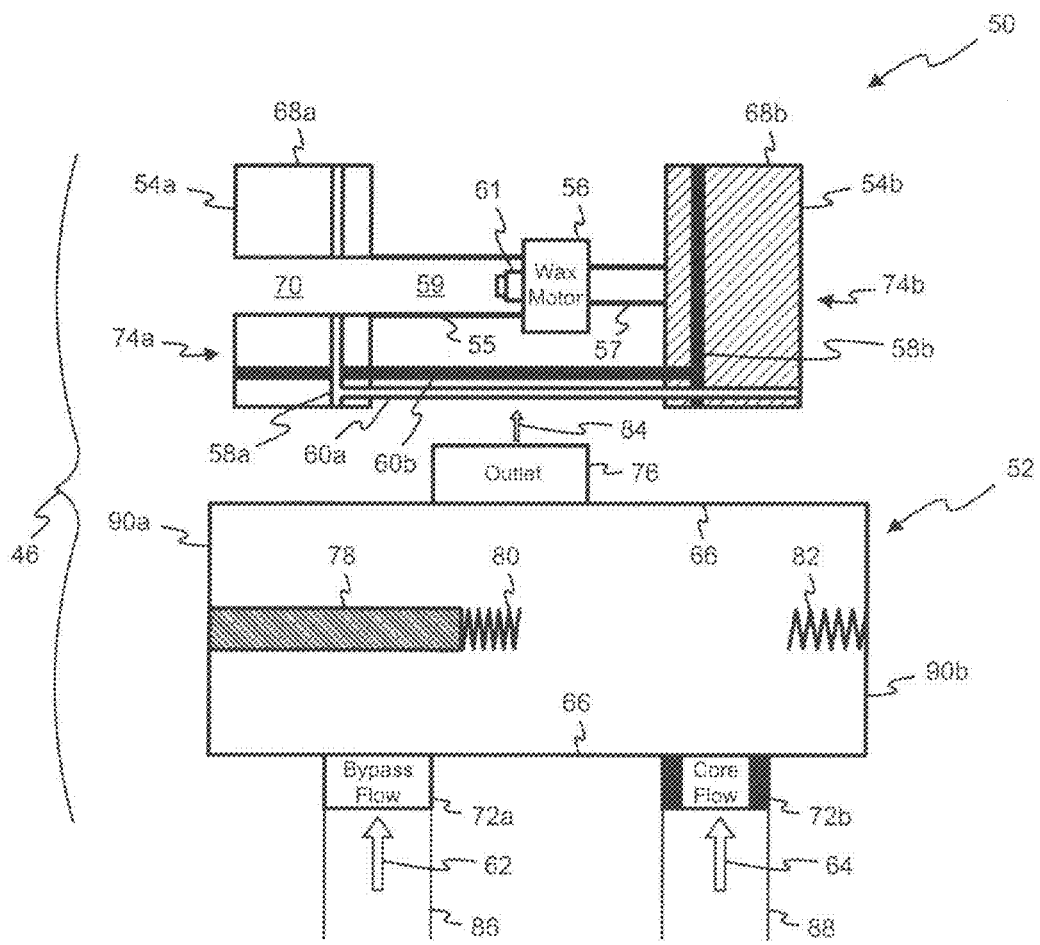
FIG. 2 is an exploded view of one embodiment of a valve.

Referring to FIG. 2, an exploded view of the valve 46 is shown. The valve 46 includes a spool 50 and a valve housing 52 within which the spool 50 is used. Spool 50 is slidingly received within valve housing 52 and is used to regulate temperatures of the working fluid by controlling the relative flow rates and mixing of the bypass flow of working fluid 62 and the core flow of working fluid 64.

Spool 50 is a sliding spool in the illustrative embodiment and includes lands 54a and 54b, members 55 and 57, a temperature motor 56, conduits 58a and 58b, and cross conduits 60a and 60b. Lands 54a and 54b are configured as cylindrical piston shapes in the illustrated embodiment and in operation contact an interior surface 66 of valve housing 52. Some forms of the lands 54a and 54b can be non-cylindrical. Furthermore, in some forms the lands 54a and 54b can be different. Although two lands 54a and 54b are shown in the illustrated embodiment, spool 50 may have any number of other lands in other embodiments. Land 54a includes an aperture 70 formed therein. In some forms, however, land 54a may be solid. Land 54b, on the other hand, is substantially solid. The outer periphery 68a and 68b of lands 54a and 54b have conduits 58a and 58b formed therein.

Members 55 and 57 extend between the temperature motor 56 and lands 54a and 54b. Members 55 and 57 can be circular in cross sectional shape but can also take on different shapes in other embodiments. The members 55 and 57 can have any variety of lengths suitable to any given application. In some embodiments members 55 and 57 are different in size and/or shape. Furthermore, some forms of the present application may not need either or both of members 55 or 57. In the illustrative embodiment, an aperture 59 is formed in member 55 and is used to interact with other structure described further below. Some forms of member 55 may not include aperture 59.

Conduits 58a and 58b are used to convey working fluid within the valve 46. The conduits 58a and 58b can be formed in a periphery of the lands 54*a* and 54*b* such that the working fluid conveyed by the conduits 58*a* and 58*b* traverse a cavity formed between the lands 54*a* and 54*b* and the valve housing 52. Alternatively and/or additionally, the conduits 58*a* and 58*b* can be formed in an inside surface of the valve housing 52. In yet other forms, the conduits 58*a* and 58*b* can have portions formed internal to lands 54*a* and 54*b*. In one form the conduits 58*a* and 58*b* are configured as semicircular in cross section, but other shapes are also contemplated. For example, conduits 58*a* and 58*b* can be rectangular in cross sectional shape, to set forth just one non-limiting example. Conduits 58*a* and 58*b* can be formed around the periphery of lands 54*a* and 54*b*, but in some embodiments the conduits 58*a* and 58*b* may not extend around the entire periphery. To set forth just one non-limiting example, if the lands 54*a* and 54*b* are circular, the conduits 58*a* and 58*b* may or may not extend around the entire circumference of the lands 54*a* and 54*b*. In some forms the conduits 58*a* and 58*b* can be configured to remain in fluid communication with inlets 72*a* and 72*b* no matter the orientation of spool 50. For example, in some forms if the spool were clocked within the valve housing 52, the conduits 58*a* and 58*b* may still remain in communication with core flow of working fluid 64 and/or bypass flow of working fluid 62. Though the conduits 58*a* and 58*b* have been discussed herein together, it will be appreciated that the conduits 58*a* and 58*b* can be different in size, shape, length, and/or operation, among other possible variations.

Temperature motor 56 reacts to temperature variations by moving a structure, such as an arm 61 as shown in the illustrative embodiment. The actuation of the temperature motor 56 can be provided by a eutectic wax or bimetallic disks, to set forth just two non-limiting examples. At a relatively high temperature the arm 61 in the illustrative embodiment is extended to a maximum distance, and at a relatively cool temperature the arm is retracted to a minimum distance. The minimum distance can be a distance within the temperature motor such that the arm 61 is completely retracted within a recess (not shown). In one form the temperature motor 56 is a wax motor. The arm 61 extends along the length of the spool 50 in the illustrative embodiment, but in other forms the arm 61 may extend at an angle relative to the spool 50. The arm 61 may also rotate in some forms. In some forms the temperature motor 56 can contain more than one arm 61. Spool 50 is shown having temperature motor 56 attached therein, but in other embodiments temperature motor 56 may be coupled to the valve housing 52. For example, the temperature motor 56 may be fixed relative to the valve housing 52 and an energy storage device 80 can be configured to move with the spool 50. In some forms the temperature motor 56 can be integrated with one of the lands 54*a* or 54*b* as opposed to being affixed between members 55 and 57.

The cross conduits 60*a* and 60*b* are used to convey working fluid within the valve 46 and extend between lands 54*a* and 54*b*. Cross conduits 60*a* and 60*b* serve to configure inlets 72*a* and 72*b* in fluid communication with ends 74*a* and 74*b* of lands 54*a* and 54*b*. In one form cross conduits 60*a* and 60*b* are circular in cross section and generally elongate in shape, but may take on different forms in other embodiments. Cross conduits 60*a* and 60*b* can be displaced radially inward of outer periphery 68*a* and 68*b* to avoid contact with interior surface 66 of valve housing 52. In some embodiments, however, cross conduits 60*a* and 60*b* may be at least partially formed in the outer periphery 68*a* and 68*b*. In these forms the fluid traversing cross conduits 60*a* and 60*b* can, but need not be in contact with interior surface 66. In some embodiments, cross conduits 60*a* and 60*b* may be formed in valve housing 52 and configured to be routed directly from bypass flow of working fluid 62 and core flow of working fluid 64 as opposed to being routed through lands 54*a* and 54*b*. For example, cross conduits 60*a* and 60*b* may be routed from a bypass conduit 86 and core conduit 88 direct to housing ends 90*a* and 90*b*.

Aperture 70 can be formed in land 54*a* to permit passage of a stem 78 as will be discussed below. In some forms the aperture 70 may not be formed, as will be apparent from the discussion of the stem 78 below. Aperture 70 can have any variety of cross sectional shapes and/or sizes. In some forms the aperture 70 can change shape and/or size along the length of the land 54*a*.

Valve housing 52 includes inlets 72*a* and 72*b*, outlet 76, stem 78, and energy storage devices 80 and 82. The inlet 72*a* accepts the bypass flow of working fluid 62 and conveys the bypass flow of working fluid 62 to an interior to the valve housing 52. The inlet 72*b* accepts the core flow of working fluid 64 and conveys the core flow of working fluid 64 to the interior of the valve housing 52. The inlets 72*a* and 72*b* can take on any variety of shapes, sizes, and/or forms and need not be the same. Outlet 76 conveys the outlet flow of working fluid 84 which is a mixture of bypass flow of working fluid 62 and core flow of working fluid 64, the proportions of which are determined by the axial position of the spool 50 relative to the valve housing 52. More particularly, the outlet flow of working fluid 84 is dependent on the locations of lands 54*a* and 54*b* relative to inlets 72*a* and 72*b*. Various examples of the relative locations are described further below.

Stem 78 extends within the valve housing 52 and is used to provide a standoff support structure for energy storage device 80. In some forms the stem 78 can be formed unitary with or coupled to the valve housing 52. In the illustrative embodiment the stem 78 extends through the land 54*a*, but in some embodiments the stem 78 may not extend through. For example, the stem 78 can extend from the valve housing 52 between the lands 54*a* and 54*b* and still provide a standoff for energy storage device 80. Stem 78 can have any variety of shapes and/or sizes. Furthermore, the stem 78 can be configured to be cooperatively received in aperture 70 formed in land 54*a*. In some forms a fluid seal may be provided between or may be formed when aperture 70 receives stem 78. Piston rings or other structure can be incorporated into stem 78 and/or aperture 70 to discourage the transmission of working fluid at the interface between stem 78 and aperture 70.

Energy storage devices 80 and 82 are used to provide forces between the spool 50 and valve housing 52. Energy storage devices 80 and 82 can take on a variety of forms such as, but not limited to, coil springs, leaf springs, cantilevered springs, or torsion springs. Energy storage devices 80 and 82 can also be members made of elastomeric materials. In one form energy storage device 80 can produce a force depending on, for example, its unstretched length, operating length, and spring constant. In one form energy storage device 82 can also produce a force depending on, for example, its unstretched length, operating length, and spring constant. The energy storage devices 80 and 82 can be dissimilar. Although two energy storage devices 80 and 82 are depicted in the illustrative embodiment, the numbers of springs may vary in other embodiments. For example, additional springs can be added to supplement energy storage device 82. Furthermore, some embodiments may include only one spring. To set forth one non-limiting example, the energy storage device 82 can be removed in some embodiments. Energy storage devices 80 and 82 can also have alternative locations than those depicted in the illustrative embodiment. For example, energy storage device 82 may be disposed on an opposite end of the valve housing 52. The energy storage devices 80 and/or 82 can be engaged or coupled with a variety of structure of the valve 46.

Figure 3:
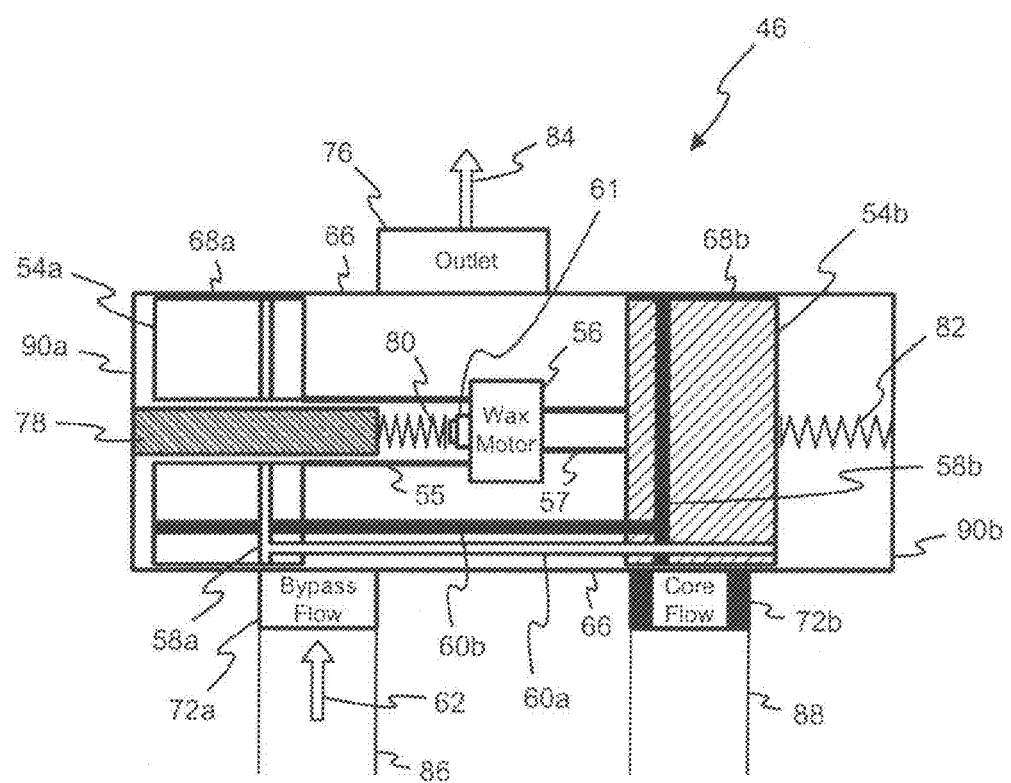
FIG. 3 depicts one embodiment of a valve in a relatively cold operating position.

Referring now to FIG. 3, spool 50 is shown disposed within valve housing 52 and is shown in a cold configuration. In one form the relatively cold configuration represents the relative location of the spool 50 to the valve housing 52 when the gas turbine engine 40 (shown in FIG. 1) is initially started and the core flow of working fluid 64 is in a relatively cool state. The arm 61 is in a relatively retracted position. The balance of the pressure acting on the ends 74a and 74b, and the force of energy storage devices 80 and 82 on the spool 50 result in a position of the spool 50 near the side of the valve housing 52 that exposes the inlet 72a and closes the inlet 72b. In this configuration, substantially all of the initial flow stream of working fluid (mentioned above) flows through inlet 72a such that little to no working fluid is cooled by the heat exchanger (not shown).

Figure 4:
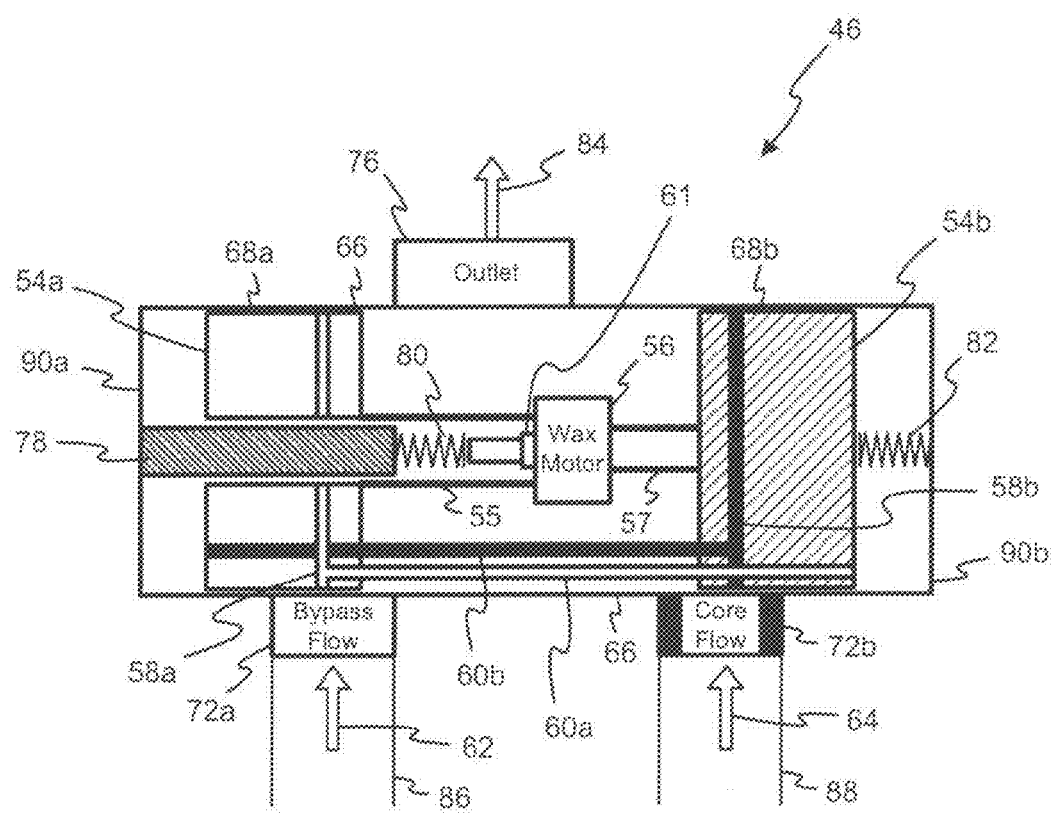
FIG. 4 depicts one embodiment of a valve in a relatively warm operating position.

FIG. 4 depicts spool 50 disposed within valve housing 52 in a relatively warm configuration. In one form the relatively warm configuration represents the relative location of the spool 50 to the valve housing 52 when the gas turbine engine 40 is in a relatively warm state. The arm 61 is in a relatively moderately extended position. The balance of the pressure acting on the ends 74a and 74b, and the force of energy storage devices 80 and 82 on the spool 50 result in a position of the spool 50 in a relative middle of the valve housing 52 that exposes the inlet 72a and the inlet 72b. In this configuration, working fluid flows through inlets 72a and 72b such that a mixture of bypass flow working fluid 62 and core flow of working fluid 64 mix and are conveyed through outlet 76.

Figure 5:
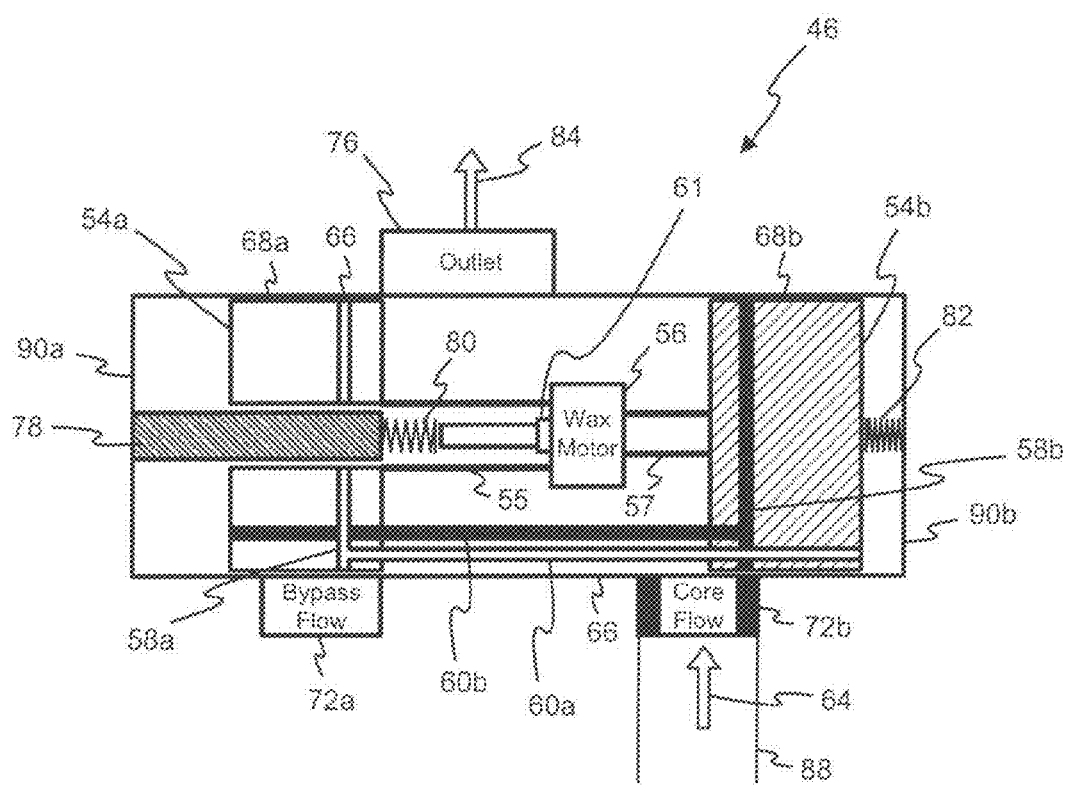
FIG. 5 depicts one embodiment of a valve in a relatively hot operating position.

FIG. 5 depicts spool 50 disposed within valve housing 52 in a relatively hot configuration. In one form the relatively hot configuration represents the relative location of the spool 50 to the valve housing 52 when the gas turbine engine 40 is in a relatively hot state. The arm 61 is in a relatively high extended position. The balance of the pressure acting on the ends 74a and 74b, and the force of energy storage devices 80 and 82 on the spool 50 result in a position of the spool 50 near the side of the valve housing 52 that exposes the inlet 72b and closes the inlet 72a. In this configuration, substantially all of the initial flow stream of working fluid (mentioned above) flows through inlet 72b such that little to no working fluid is bypassed.

Figure 6:
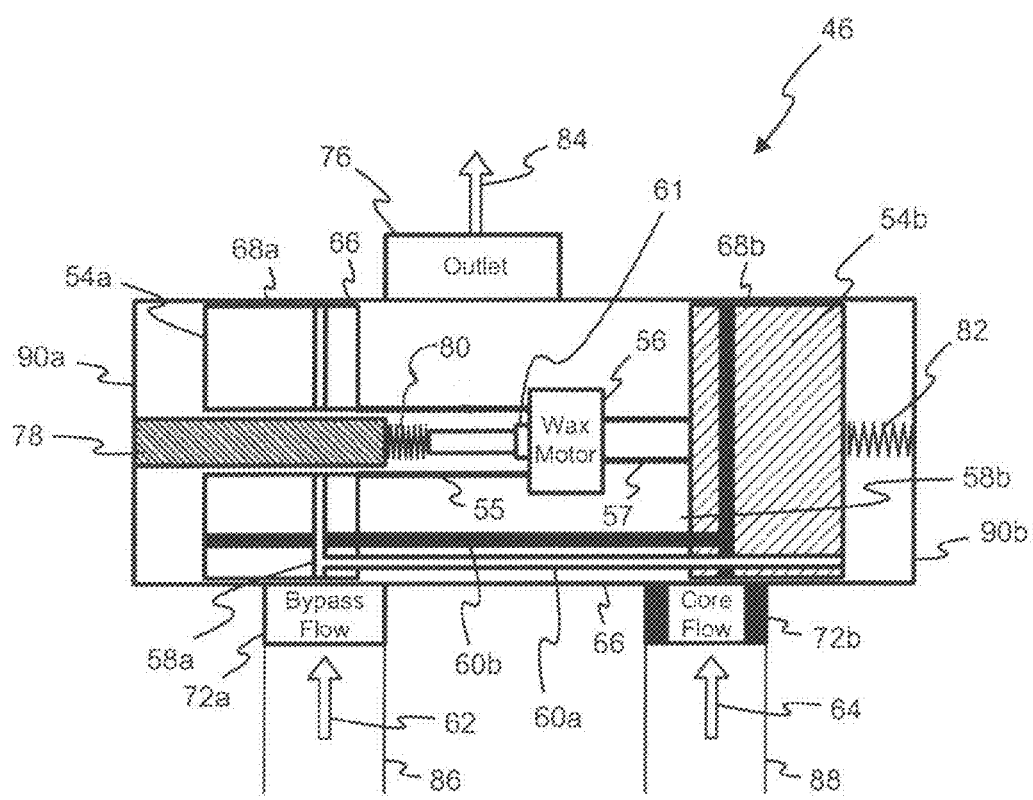
FIG. 6 depicts one embodiment of a valve in a relatively cold operating position with pressure relief.

FIG. 6 depicts spool 50 and valve housing 52 in a relatively warm state, but arm 61 is in a relatively high extended position. This state exists when the pressure relief function supersedes the thermal actuation function. Arm 61 is in a relatively high position due to relatively hot conditions, but energy storage device 80 is relatively compressed. In this configuration the pressure in the core flow of working fluid 64 is low enough to force the spool 50 to the left since the pressure in the working fluid 64 is conveyed to the end 74a of land 54a through conduit 58b and cross-conduit 60b. The balance of the difference in pressures acting on the ends 74a and 74b, and the force of energy storage devices 80 and 82 on the spool 50 result in a position of the spool 50 that at least partially exposes the inlet 72a such that the relatively high pressure condition of the working fluid 62 can be relieved by flowing the working fluid 62 through inlet 72a. This scenario simulates a blockage from the initial flow stream of the working fluid to working fluid 64, such as a blocked or fouled heat exchanger (not shown). This function limits the differential pressure between the initial flow stream and fluid 84.

One embodiment of the present application provides an apparatus comprising a gas turbine engine spool valve having a spool and a first inlet in proximity to a first spool land and a second inlet in proximity to a second spool land, the first inlet in fluid communication with and an end of the second spool land, the second inlet in fluid communication with an end of the first spool land, the spool operable to move with changes in temperature of a working fluid internal to the gas turbine engine spool valve, and operable to move with changes in pressure between a working fluid at the end of the first spool land and a working fluid at the end of the second spool land.

One form of the present application provides an apparatus comprising a gas turbine engine valve housing having two inlets; a valve member having two ends in fluid communication with the two inlets; a temperature motor operable to change the position of the valve member upon changes in temperature of a working fluid from either or both of the two inlets; an energy storage device operable to change the position of the valve member upon changes in pressure of a working fluid at the two ends of the valve member; and wherein the valve member is operable to selectively close a first inlet at a first valve condition or a second inlet at a second valve condition.

Another form of the present application provides a method comprising a gas turbine engine spool valve positioned within a valve housing; a means for thermally positioning the gas turbine engine spool valve; and a means for pressure positioning the gas turbine engine spool valve.

Yet another form of the present application provides a method comprising flowing a first portion of working fluid to a first inlet and a second portion of working fluid to a second inlet; positioning a gas turbine engine valve having a first end and a second end based upon a temperature of a mixture of the first portion and second portion; adjusting the gas turbine engine valve based upon a pressure difference of the first portion of working fluid upon the second end and a second portion of working fluid upon the first end; and closing the first inlet at a first operating condition or the second inlet at a second operating condition.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:
1. An apparatus comprising:
a gas turbine engine spool valve having a spool and
a first inlet in proximity to a first spool land and
a second inlet in proximity to a second spool land,
the first inlet in fluid communication with an end of the second spool land,
the second inlet in fluid communication with an end of the first spool land, the spool operable to move with changes in temperature of a working fluid internal to the gas turbine engine spool valve, and operable to move with changes in pressure between a working fluid at the end of the first spool land and a working fluid at the end of the second spool land; and which further includes a first conduit formed between and not extending beyond the first spool land and the second spool land, the first conduit in fluid communication with the first inlet and the end of the second spool land.

2. The apparatus of claim 1 which further includes an outlet, the position of the two lands within a valve housing determining the flow rate of a working fluid out of the outlet.

3. The apparatus of claim 1 which further includes a channel formed between a housing and the first spool land.

4. The apparatus of claim 3 wherein the channel is formed around the circumferential periphery of the first spool land.

5. The apparatus of claim 1 which further includes a temperature motor responsive to the temperature of the working fluid internal to the gas turbine engine spool valve.

6. The apparatus of claim 5 which further includes a valve housing and an energy storage device having an end fixed relative to the valve housing and an end coupled with the temperature motor.

7. The apparatus of claim 6 which further includes a second energy storage device coupled to the valve housing and the spool.

8. An apparatus comprising:
a gas turbine engine valve housing having two inlets;
a valve member having two ends in fluid communication with the two inlets;
a temperature motor operable to change the position of the valve member upon changes in temperature of a working fluid from either or both of the two inlets;
an energy storage device operable to change the position of the valve member upon changes in pressure of a working fluid at the two ends of the valve member; and
wherein the valve member is operable to selectively close a first inlet at a first valve condition or a second inlet at a second valve condition;
wherein the temperature motor is operable to move with the valve member;
which further includes a cross conduit in fluid communication with the circumferential conduit and formed between and not extending beyond the two ends of the valve member.

9. The apparatus of claim 8 wherein the valve member and the gas turbine engine valve housing are coupled through the energy storage device.

10. The apparatus of claim 8 which further includes a second energy storage device, the energy storage device coupled between the gas turbine engine valve housing and the temperature motor, the second energy storage device coupled between the gas turbine engine valve housing and the valve member.

11. The apparatus of claim 8 which further includes a circumferential conduit formed between a first end of the valve member and the gas turbine engine valve housing.

12. An apparatus comprising:
a gas turbine engine spool valve positioned within a valve housing;
means for thermally positioning the gas turbine engine spool valve; and
means for pressure positioning the gas turbine engine spool valve;
the gas turbine engine spool valve having a spool and
first and second inlets, the first inlet in relatively closer proximity to a first spool land than a second spool land and
the second inlet in relatively closer proximity to a second spool land than to a first spool land,
the first inlet in fluid communication with an end of the second spool land via a first conduit;
the second inlet in fluid communication with an end of the first spool land via a second conduit that is different from the first conduit,
wherein the first conduit is formed between and does not extend beyond the first spool land and the second spool land.

13. A method comprising:
flowing a first portion of working fluid to a first inlet and a second portion of working fluid to a second inlet;
positioning a gas turbine engine valve having a first end and a second end based upon a temperature of a mixture of the first portion and second portion;
adjusting the gas turbine engine valve based upon a pressure difference of the first portion of working fluid upon the second end and a second portion of working fluid upon the first end;
closing the first inlet at a first operating condition or the second inlet at a second operating condition;
which further includes conveying the first portion of the working fluid from the first inlet to the second end via a conduit formed between and not extending beyond the first end and the second end.

14. The method of claim 13 which further includes conveying a working fluid around a circumferential periphery of the gas turbine engine valve.

15. The method of claim 13 which further includes opposing movement of the gas turbine engine valve with an energy storage device.

16. The method of claim 15 which further includes balancing the gas turbine engine valve with a second energy storage device.

17. The method of claim 13 wherein the positioning includes moving an arm of a temperature motor in response to a change temperature of the mixture.

* * * * *